(12) United States Patent
Dackefjord et al.

(10) Patent No.: US 11,402,491 B2
(45) Date of Patent: Aug. 2, 2022

(54) METHOD FOR DETERMINING A DISTANCE BETWEEN TWO NODES

(71) Applicant: NIDA TECH SWEDEN AB, Malmö (SE)

(72) Inventors: Håkan Dackefjord, Älvsjö (SE); Warwick Taws, Bromma (SE)

(73) Assignee: NIDA TECH SWEDEN AB, Malmö (SE)

( * ) Notice: Subject to any disclaimer, the term of this patent is extended or adjusted under 35 U.S.C. 154(b) by 96 days.

(21) Appl. No.: 16/758,451

(22) PCT Filed: Nov. 13, 2018

(86) PCT No.: PCT/SE2018/051159
§ 371 (c)(1),
(2) Date: Apr. 23, 2020

(87) PCT Pub. No.: WO2019/103680
PCT Pub. Date: May 31, 2019

(65) Prior Publication Data
US 2020/0278441 A1    Sep. 3, 2020

(30) Foreign Application Priority Data
Nov. 22, 2017   (SE) .................................. 1751434-0

(51) Int. Cl.
*G01S 13/76*   (2006.01)
*H04L 43/067*  (2022.01)

(52) U.S. Cl.
CPC .......... *G01S 13/762* (2013.01); *G01S 13/767* (2013.01); *H04L 43/067* (2013.01)

(58) Field of Classification Search
CPC ........ G01S 13/762; G01S 13/767; G01S 5/02; G01S 5/14; H04L 43/067
See application file for complete search history.

(56) References Cited

U.S. PATENT DOCUMENTS

| | | | |
|---|---|---|---|
| 2010/0034191 A1* | 2/2010 | Schulz | G01D 21/00 370/350 |
| 2010/0135178 A1 | 6/2010 | Aggarwal et al. | |
| 2014/0213193 A1* | 7/2014 | Zhang | G01S 5/06 455/67.11 |
| 2016/0234704 A1 | 8/2016 | Aldana | |
| 2019/0069263 A1* | 2/2019 | Ylamurto | H04W 64/003 |
| 2020/0099444 A1* | 3/2020 | Li | H04B 10/077 |

* cited by examiner

*Primary Examiner* — Timothy X Pham
(74) *Attorney, Agent, or Firm* — Duane Morris LLP; Gregory M. Lefkowitz; Randall C. Pyles

(57) ABSTRACT

The present invention relates to a method and a first node for performing the method of determining a distance between the first and a second node. The method comprises time stamping a data packet to be transmitted from the first node to the second node with a first time stamp, transmitting said data packet to the second node, receiving the transmitted data packet back from the second node, repeating the transmitting and receiving step at least one more time, time stamping the last received data packet from the second node with a second time stamp, and calculating the distance between the first and second node based on the first and second time stamp, the number of repetitions of the repeating step and the internal delays in the first and second node.

9 Claims, 4 Drawing Sheets

METHOD FOR DETERMINING A DISTANCE BETWEEN TWO NODES

CROSS-REFERENCE TO RELATED APPLICATIONS

This application is a § 371 national stage entry of International Application No. PCT/SE2018/051159, filed Nov. 13, 2018, which claims priority of Sweden National Application No. 1751434-0, filed Nov. 22, 2017, the entire contents of which are incorporated herein by reference.

TECHNICAL FIELD

The present invention relates generally to an enhanced time stamping method for distance measurements and positioning solutions and a node for performing such distance measurements.

BACKGROUND ART

When determining the distance between two devices one may measure the time it takes for a signal travelling between the devices. One way is to time stamp the signal when it leaves one device and when it arrives at another device and then use the time difference between the time stamps to calculate the distance in between. The accuracy or resolution of time stamping is highly dependent on clock frequencies in the nodes and on transmission frequencies. Higher clock and transmission frequencies increase the resolution of the timing. If you for example use a clock frequency of 40 Mhz, the shortest possible time between two time stamps is 25 nanoseconds. Having a time of flight between two devices that also is in the range nanoseconds will lead to considerable errors due to the poor resolution of the time stamp. Thus, to increase the clock frequency when performing distance measurements increases the resolution in general and provides better accuracy. However, with the clock frequencies available today it is difficult to accurately measure time of flight, time difference of arrival, and similar solutions due to the fact that even very small errors in the time measurements, due to the poor resolution of the time stamps, translate into large errors in a distance calculation or positioning determination. Further, higher clock frequencies in general consumes more energy and for small devices, especially in the Internet of Things, IoT, low power consumption is crucial.

Time stamping is a sequence of digits or characters in a data packet that indicates when a certain event has occurred. Normally the time stamp indicates at least any one of a time or date but time stamping can also be conducted based on an internal time, such as a system uptime clock, system clock, or any other available time information in a device. The accuracy depends on the application area but for distance measurements and positioning systems where fractions of seconds must be accounted for it is difficult to achieve the accuracy needed in order to enable such systems to work satisfactory.

In the field of digital technology time stamping is the time when an event is recorded and not the time the event actually occurred. There is a significant difference between the actual time of an event and the time when a computer, such as a microprocessor, records the event. All digital systems comprise delays, large or small, that affect the accuracy and resolution of time stamping.

Time stamping is, as mentioned above, often used to determine the time difference between two events, such as sending a data packet and receiving a data packet. In prior art positioning systems, it is therefore common practice to first synchronize a clock with high accuracy between the sending and receiving end of a system. Thereafter, such systems are able to determine the time a data packet has traveled.

In the field of positioning technology one of the best-known systems is the Global Positioning System, GPS. GPS utilizes one-way communication between several satellites and a device on earth. The GPS satellites have very accurate atomic clocks that are continually synchronized, via earth, between different GPS satellites. Each satellite constantly transmits its current time and position which is receivable for a GPS receiver on earth. Based on time, and especially time difference, the device is able to determine its position derived from the positions of the GPS satellites and the time difference between received data packets from different GPS satellites.

A problem with conventional time stamping is the difference between the actual time an event occurs and the time the system actual records the time stamp. The solution in prior art to eliminate this is to minimize and/or stabilize the processing time, using higher frequencies of transmission and higher clock frequencies in the device.

SUMMARY OF INVENTION

An object of the present invention is to enable accurate time stamping in a positioning and/or distance determining system for short and medium short distances, i.e. about 0 to 1,000 meters. In some embodiments the present invention enables accurate time stamping in a positioning and/or distance determining system for even longer distances, such as 1,000 to 15,000 meters.

Prior art solutions focus on minimizing or stabilizing the processing time in order to reduce the error in distance measurements. The present solution use a completely different solution wherein multiple processing times are allowed in the system. The processing time is still relevant but for the present solution it is more important to stabilize the processing time than minimizing it. In some embodiments, minimizing the processing time is the same as achieving a constant processing time through minimizing the uncertainties. Instead of minimizing the processing times a system wherein a substantially constant and accurate processing time can be achieved has been developed.

According to an aspect there is provided a method that is performed by a first node for determining a distance between the first and a second node. The method time stamps a data packet that is to be transmitted from the first node to the second node with a first time stamp, transmits the data packet to the second node and receives the transmitted data packet back from the second node. The transmitting and receiving steps are repeated at least one more time and then the last received data packet from the second node is time stamped with a second time stamp and the first node calculates the distance between the first and second node based on the first and second time stamp, the number of repetitions of the repeating step and the internal delays in the first and second node.

In one embodiment the method further comprises estimating the distance between the first and second node based on a first round trip time between the first and second node for the data packet, and determining the number of repetitions for the repeating step based on the estimated distance.

Preferably the number of repetitions of the repeating step decreases when the estimated distance increases, i.e. the shorter the estimated distance is the more repetitions are performed. In an exemplary embodiment, the number of repetitions are in the range of 2 to 10,000 repetitions, preferably between 10 to 1,000 repetitions.

In another embodiment the step of calculating the distance between the first and second node comprises determining an overall time between the first and second time stamp, subtracting accumulated internal delays in each of the first and second node from the overall time to obtain a total travelling time, and dividing the total travelling time with two times the number of repetitions to obtain an average time for the data packet to travel from the first to the second node.

According to another aspect there is provided a first node for determining a distance between the first and a second node, wherein the first node comprises a processing unit and a memory, the memory comprising instructions which when executed by the processing unit causes the first node to time stamp a data packet to be transmitted from the first node to the second node with a first time stamp, transmit the data packet to the second node, receive the transmitted data packet back from the second node, repeat the transmit and receive steps at least one more time, time stamp the last received data packet from the second node with a second time stamp, and calculate the distance between the first and second node based on the first and second time stamp, the number of repetitions of the repeating step and the internal delays in the first and second node.

In one embodiment the first node is further caused to estimate the distance between the first and second node based on a first round trip time between the first and second node for the data packet, and determine the number of repetitions for the repeating step based on the estimated distance.

Preferably the first node is further caused to decrease the number of repetitions of the repeating step when the estimated distance increases, i.e. the shorter the estimated distance is the more repetitions are performed. In one exemplary embodiment, the first node is further caused to repeat the repeating step up to 10000 repetitions, preferably between 10 to 1000 repetitions.

In another embodiment the first node is further caused to determine an overall time between the first and second time stamp, subtract accumulated internal delays in each of the first and second node from the overall time to obtain a total travelling time, and divide the total travelling time with two times the number of repetitions to obtain an average time for the data packet to travel from the first to the second node, in order to calculate the distance between the first and second node.

In yet another embodiment the processing unit in the first node comprises a system clock for generating a time base, the system clock being unsynchronized in relation to a system clock in a processing unit of the second node.

According to another aspect there is also provided a computer program comprising computer program code, the computer program code being adapted, if executed by the processing unit of the first node, to implement the method.

According to yet another aspect there is provided a computer program product comprising a computer readable storage medium, the computer readable storage medium having the above mentioned computer program.

By repeating the steps of transmitting and receiving the data packet, i.e. "ping-ponging" the data packet back and forth between the first and second node and only time stamping the data packet when it is leaving the first node the first time and when it is finally received at the first node, the error in time stamping gets divided by the number of ping-pong. Thus, if the data packet gets ping-ponged a 1000 times the time stamp error will be reduced by a factor 1000. This is fantastic and such accuracy cannot be achieved by just increasing for example the clock speed. This, is achieved with use of only two time stamps and without any need to synchronize any system clocks between different nodes.

BRIEF DESCRIPTION OF DRAWINGS

The invention is now described, by way of example, with reference to the accompanying drawings, in which.

DESCRIPTION OF EMBODIMENTS

In the following, a detailed description of the method performed by a first node for determining a distance between the first and a second node will be made.

Figure 1:
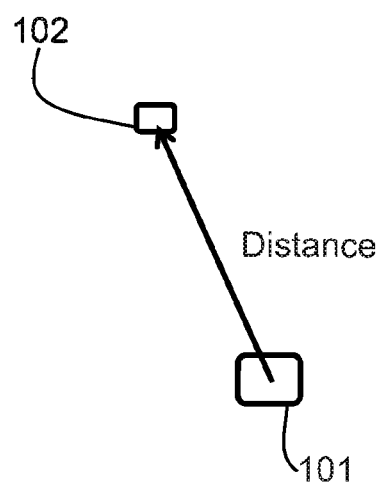
FIG. 1 is a general view of a scenario where a first node is to determine the distance to a second node.

FIG. 1 is a general view of a scenario showing the first node 101 and the second node 102. It is the distance between these two nodes 101, 102 that is to be determined. The first node 101 may for example be a User Equipment, UE such as a mobile phone, smart phone, PDA, tablet, PC, laptop or similar or it can be a dedicated locator device used for locating and determining the distance to a second node 102. An exemplary first node 101 will be described closer in conjunction with FIG. 5. The second node 102 may also be a UE as the first node 101, but could also be a more passive device comprising a radio frequency transceiver. At some time, a user wants to determine the distance to or locate the second node 102. Examples of such an occasion can be, without limitation, when the object has been stolen, lost, or when a person having the device is missing. In such a situation, the user may use the first node 101 to determine the distance to the second node 102. An exemplary second node 102 will be described closer in conjunction with FIG. 6.

The first node 101 is provided with a transceiver for transmitting and receiving radio signals over an air interface. In a similar manner, the second node 102 is provided with a transceiver for transmitting and receiving radio signals over an air interface. The first and second node 101 and 102 can be in direct communication with each other over the air-interface for example using a Local Area Network (LAN) protocol signaling or a similar communication protocol. The LAN signaling protocol can be any suitable protocol such as IEEE 802.11 (Institute of Electrical and Electronics Engineers), including but not limited to 802.11a/b/n or other similar forthcoming standards. Other examples of standards which may be supported are: Zigbee, Bluetooth, RFID (Radio frequency identification), USB (Universal serial bus). The mentioned protocols may also be carried by various frequencies, such as 433 MHz, 450 MHz, 900 MHz, 2.4 GHz, or 5 GHz, not limiting usage of other suitable frequencies or any similar protocol. For example, the first node 101 can transmit a data packet over the air interface to the second node 102. In response to the data packet transmitted from the first node 101, the second node 102 demodulates the data packet (to re-create the data packet) and then sends it over the air interface straight back to the first node 101.

Figure 2:
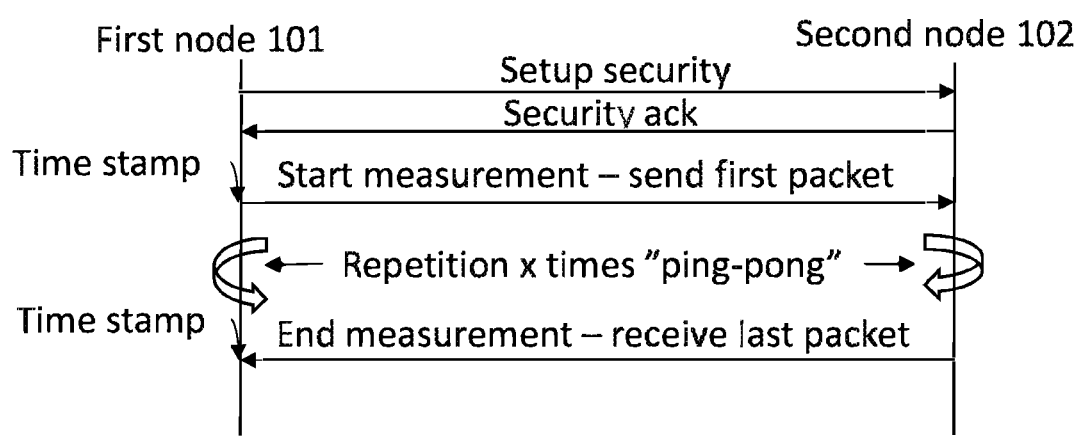
FIG. 2 is a chart illustrating the communication between the first node and the second node.
Figure 3:
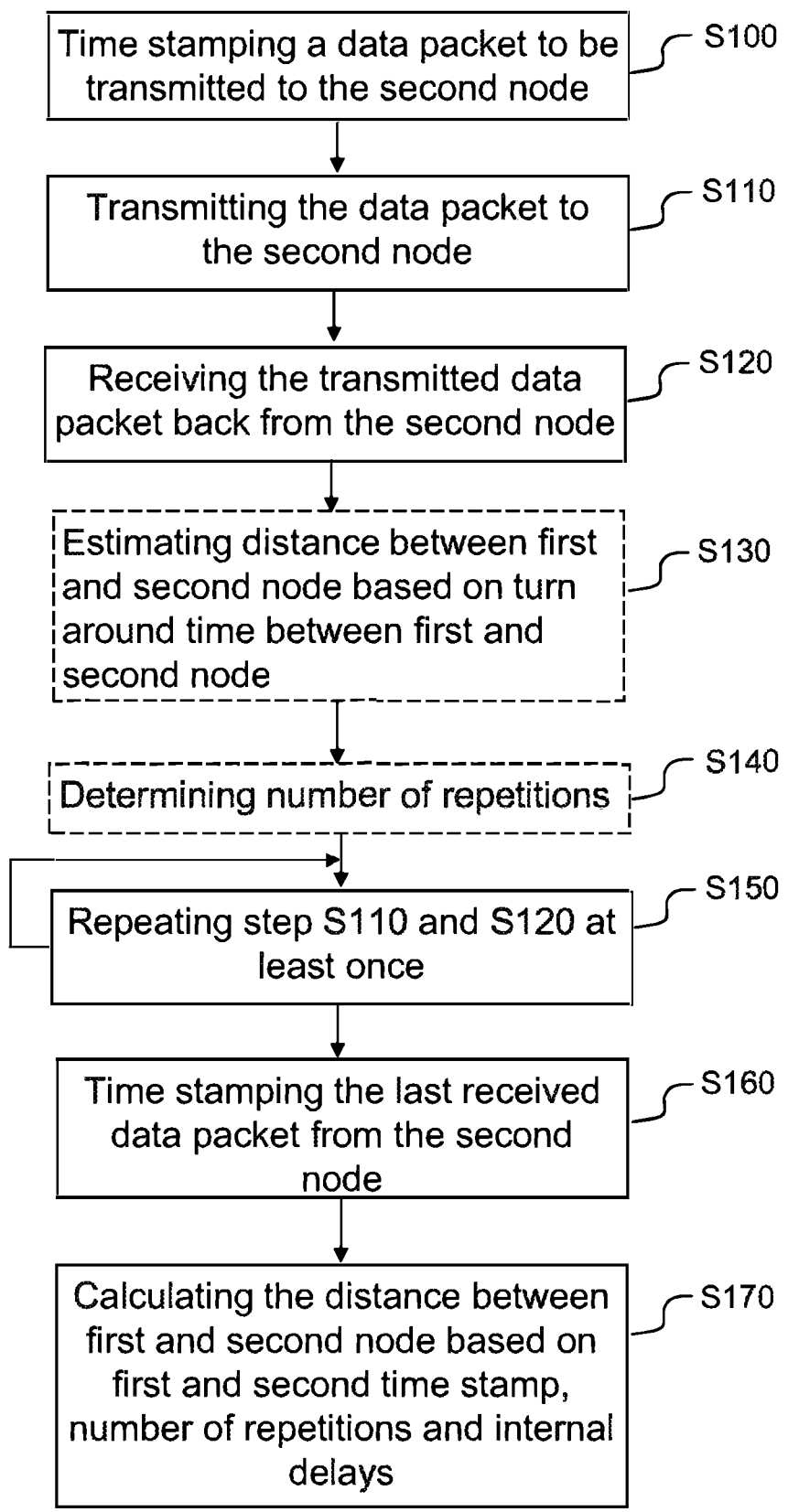
FIG. 3 is a flowchart illustrating some steps performed by the first node according to an exemplary embodiment.

Turning now to FIG. 2 and FIG. 3 the method performed by the first node 101 for determining the distance between the first 101 and the second node 102 will be closer described. FIG. 2 is a chart illustrating the communication between the first node 101 and the second node 102 and FIG. 3 is a flowchart illustrating steps performed by the first node 101 according to an exemplary embodiment.

When it is determined that the first node 101 is to perform a distance measurement between the first node 101 and the second node 102 there is in some embodiments first performed a security routine, which may be any well known security routine in the art and will therefore not be described in any greater detail here. The first node 101 sends a setup security message and gets a security acknowledgment in return from the second node 102 if everything is OK.

When the security routine has been performed the measurement starts in the first node 101, by time stamping a data packet with a first time stamp in step S100. The data packet is then transmitted, in step S110, to the second node 102. The second node 102 receives the data packet demodulates it and re-creates the data packet and sends it straight back to the first node 101. In step S120 the first node 101 receives the data packet back from the second node 102 and demodulates it and sends it straight back to the second node 102 at least one more time but preferably up to 10,000 times depending on different circumstances to be described below. Thus, steps S110 and S120 are repeated at least once, in step S150, but may for example be set to repeat 1,000 times as a default value. Thus, it may be said that the data packet is ping-ponged between the first 101 and second node 102. After steps S110 and S120 have been repeated the set or predetermined number of times the last received data packet from the second node 102 is time stamped, in step S160, with a second time stamp. Finally, in step S170, the distance between the first 101 and second node 102 is calculated. The calculation is based on the first and second time stamp, i.e. the time that has passed between the first and second time stamp, the number of repetitions of the repeating step, S150, step and the internal delays in the first 101 and second node 102. The internal delay is the time between the arrival and the departure of the data packet in the first node 101 and the second node 102, respectively.

Figure 4:
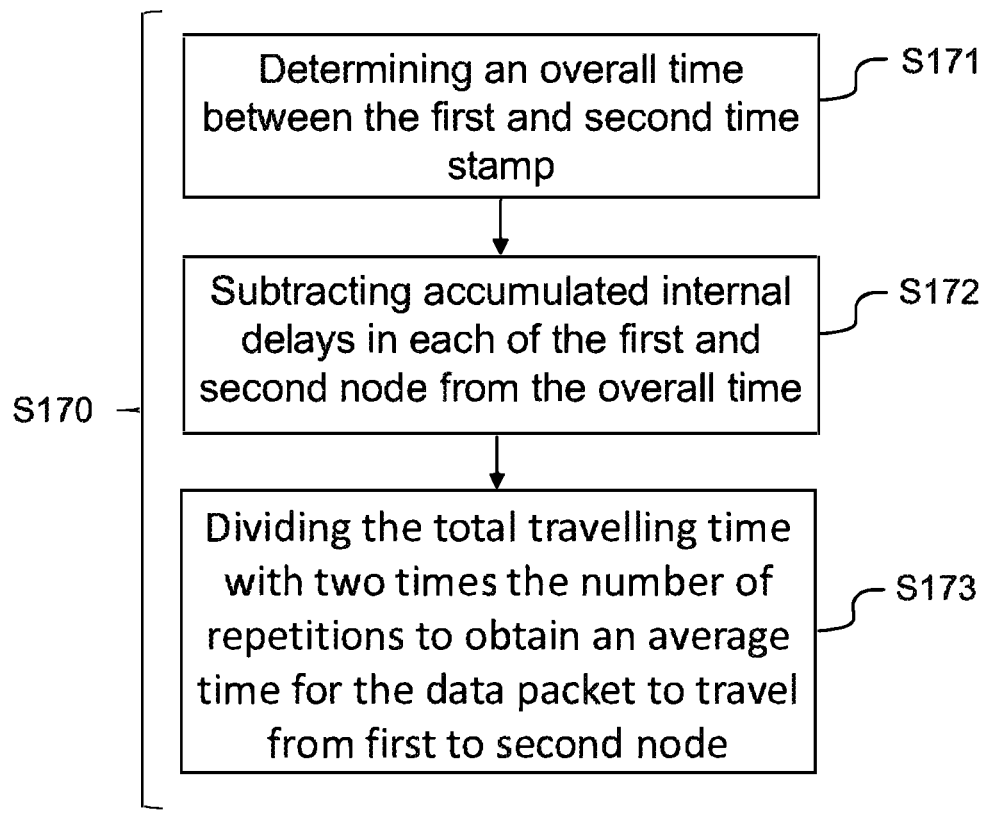
FIG. 4 is a flowchart illustrating some steps performed by the first node according to another exemplary embodiment.

In a preferred embodiment shown in FIG. 4, the step S170 of calculating the distance is described in greater detail. In a first step S171 the overall time is calculated, i.e. the time between the first and second time stamp. Thereafter, the total internal delays in each of the first 101 and second node 102 are subtracted, in step 172 from the overall time to obtain a total travelling time. The total travelling time is then divided, in step 173, with two times the number of repetitions to obtain an average time for the data packet to travel from the first 101 to the second node 102. Since the speed of travel of the data packet is known it is then possible to calculate the distance based on the calculated average time. The following example may be used to show the improvement in accuracy compared to prior art. The numbers used in the example are used to illustrate an example and should not in any way be limiting the scope of protection.

Let us assume that the distance between two nodes is 200 meters and that the first node has an internal system clock working at 24 MHz. The traveling time between the two nodes is roughly about 650 nanoseconds, i.e. about 1.3 microseconds for the round trip time, RTT. The clock frequency of 24 MHz gives an error source for one time stamping up to about 40 nanoseconds, i.e. totally a maximum of about 80 nanoseconds for two time stamps. Another error source is the internal delays in the two nodes, which may be in the range of 10s to 100s microseconds. The internal delay may be seen as reasonable stable, but also small variations in the internal delays will have a large effect on the distance calculation. Assuming an internal delay of 50 microseconds having a variation of +/−2% the error of a traditional distance calculation would be the following. The measured RRT may vary between from 1.3 to almost 1.4 microseconds depending on the time stamp resolution and the internal delays may alter the measured RRT with up to one microsecond in both directions, giving a possible range for the RRT between 0.3 to 2.4 resulting in a possible distance between 50 and 370 meters, when the actual distance is 200 meters. If one instead uses method according to the present invention "ping-ponging" the data packet for example a hundred times between the two nodes, the variations in internal delays will be negligible, since the average of 100 internal delays will be very constant. Furthermore, the poor resolution of the time stamping will be decreased with a factor 100, since only two time stamps are used. With the example figures above, the calculation of the distance would result a possible distance between 200 and 200.1 meters. Thus, a very significant improvement is achieved with this method.

Returning now to FIG. 3 the setting or predetermination of the number of repetitions of steps S110 and S120 will be described closer. As is evident in the example above the accuracy of the method increases with the distance between the first 101 and second node 102, since longer distance gives a longer travelling time and therefore the error will be smaller. Thus, if one could have a rough estimate of the distance between the first 101 and the second node 102 this could be used to set the number of repetitions in step S150. There are several ways to make a rough estimate of the distance. The estimated distance may for example be calculated based on the signal strength of the security acknowledgment or the first RU of the data packet and a response to/from the second node 102. In an alternative embodiment, the second node 102 can be set to determine the distance and communicate the distance or a parameter from which the distance can be determined such as the RTT. The distance or the parameter value can then be communicated to the first node 101. Thus, in a preferred embodiment the method also comprises estimating, in step S130 the distance between the first 101 and second node 102 based on RTT between the first 101 and second node 102 for the data packet, and determining, in step S140 the number of repetitions for the repeating step, S150, based on the estimated distance. Steps S130 and S140 are optional, which therefore are shown in FIG. 3 by dotted lines.

In another embodiment the number of repetitions of the repeating step, S150, is determined such that they decrease when the estimated distance increases, i.e. the shorter the estimated distance is the more repetitions are performed. In this way, it is possible to have the same accuracy when measuring the distance independent of the distance between the first 101 and second node 102. In yet another embodiment the number of repetitions may be predetermined and set in the range of 2 to 10,000 repetitions, preferably between 10 to 1,000 repetitions.

Figure 5:
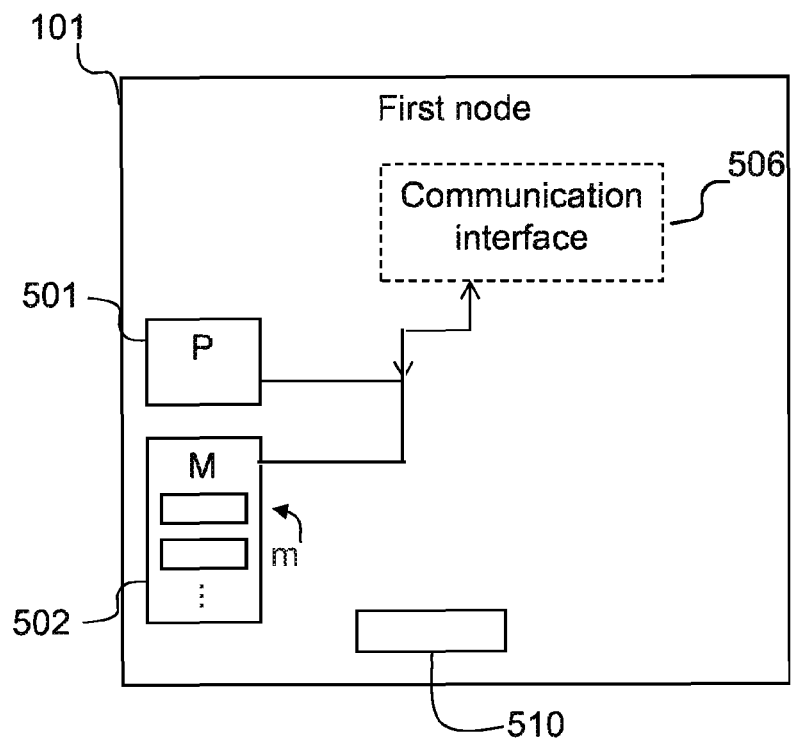
FIG. 5 is a view of the first node.

Turning now to FIG. 5 the first node will be described in more detail. The first node 101 may comprise a processing unit, a radio transceiver unit, an antenna, a battery, and optionally other supporting components for making the first node 101 operational.

FIG. 5 shows an exemplary embodiment of the first node 101. The first node 101 may be implemented, by a hardware device such as set out above. The first node can have program modules of a respective computer program comprising code means which, when run by a processing unit 501 causes the device 101 to perform the above-described methods. The processing unit 501 may comprise a single Central Processing Unit (CPU), or could comprise two or more processing units. For example, the processing unit 501 may include general purpose microprocessors, instruction set processors and/or related chips sets and/or special purpose microprocessors such as Application Specific Integrated Circuits (ASICs). The processing unit 501 may also comprise a storage for caching purposes.

Each computer program may be carried by a computer program product 502 in the first node 101 in the form of a memory having a computer readable medium and being connected to the processing unit 501. The computer program product 502 or memory thus comprises a computer readable medium on which the computer program is stored e.g. in the form of computer program modules "m". For example, the memory 502 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the device 502.

The first node 101 may further comprise a communication unit 506. The communication unit is in particular arranged to communicate with the second node 102 via a direct radio communication channel. The communication unit 506 may also be arranged for programming and/or configuration of the first node 101. In an embodiment, the communication unit 506 may comprise a chip set adopted for communication via IEEE 802.11 (Institute of Electrical and Electronics Engineers), including but not limited to 802.11a/b/n or other similar forthcoming standards. Other examples of standards which may be supported by the communication unit 506 are: Zigbee, Bluetooth, RFID (Radio frequency identification), USB (Universal serial bus). The communication unit 506 may comprise an antenna. The communication unit 506 may be connectable to an external antenna.

The first node 101 may comprise a power supply unit 510. The power supply unit may be arranged for power supply of: the processing unit 501, the memory unit 502, and/or the communication unit 506. Examples of a power supply unit 510 are, battery, capacitor, fuel cell, solar cell, inductive contact, USB-contact (Universal serial bus), wired contact, not limiting to other examples suitable for a power supply unit 510.

Figure 6:
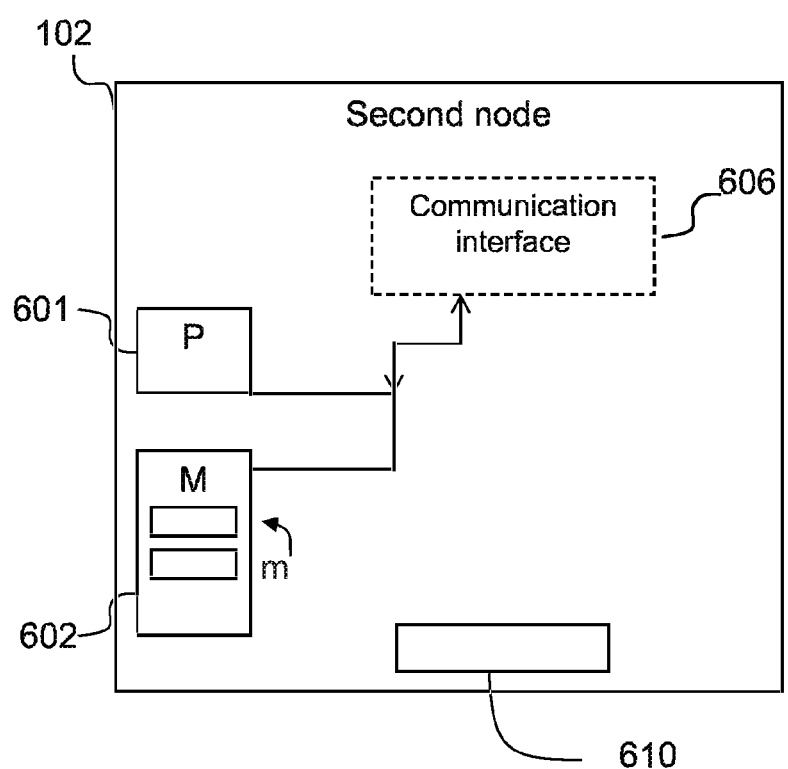
FIG. 6 is a view of the second node.

Turning now to FIG. 6 the second node 102 will also be described closer. The second node 102 to which the distance is to be measured using the first node 101 can be a small device attachable to any object that a user would want to be able to locate and measure the distance to. The second node 102 may also be integrated in an existing device such as a smart phone. An exemplary second node 102 is depicted in FIG. 6. The second node 102 may be implemented by a hardware device that can have program modules of a respective computer program comprising code means which, when run by a processing unit 601 causes the device 101 to perform the above-described methods. The processing unit 601 may comprise a single Central Processing Unit (CPU), or could comprise two or more processing units. For example, the processing unit 601 may include general purpose microprocessors, instruction set processors and/or related chips sets and/or special purpose microprocessors such as Application Specific Integrated Circuits (ASICs). The processing unit 601 may also comprise a storage for caching purposes.

Each computer program may be carried by a computer program product 602 in the second node 102 in the form of a memory having a computer readable medium and being connected to the processing unit 601. The computer program product 602 or memory thus comprises a computer readable medium on which the computer program is stored e.g. in the form of computer program modules "m". For example, the memory 602 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the device 602.

The second node 102 may further comprise a communication unit 606. The communication unit is in particular arranged to communicate with the first node 101 via a direct radio communication channel. The communication unit 606 may also be arranged for programming and/or configuration of the second node 102. In an embodiment, the communication unit 606 may comprise a chip set adopted for communication via IEEE 802.11 (Institute of Electrical and Electronics Engineers), including but not limited to 802.11a/b/n or other similar forthcoming standards. Other examples of standards which may be supported by the communication unit 606 are: Zigbee, Bluetooth, RFID (Radio frequency identification), USB (Universal serial bus). The communication unit 606 may comprise an antenna. The communication unit 606 may be connectable to an external antenna.

The second node 102 may comprise a power supply unit 610. The power supply unit may be arranged for power supply of: the processing unit 601, the memory unit 602, and/or the communication unit 606. Examples of a power supply unit 610 are, battery, capacitor, fuel cell, solar cell, inductive contact, USB-contact (Universal serial bus), wired contact, not limiting to other examples suitable for a power supply unit 610.

While the solution has been described with reference to specific exemplary embodiments, the description is generally only intended to illustrate the inventive concept and should not be taken as limiting the scope of the solution.

The invention claimed is:

1. A method performed by a first node for determining a distance between the first node and a second node wherein said method comprises:
    time stamping a data packet to be transmitted from the first node to the second node with a first time stamp,
    transmitting the data packet to the second node,
    receiving the transmitted data packet back from the second node,
    estimating the distance between the first node and second node based on a round trip time between the first node and second node for the data packet,
    determining a number of repetitions for a repeating step based on an estimated distance,
    repeating the transmitting step and the receiving step according to the number of repetitions determined in the determining step,
    time stamping a last received data packet from the second node with a second time stamp, and
    calculating the distance between the first node and the second node based on the first time stamp and the second time stamp, the number of repetitions of the repeating step, and internal delays in the first node and the second node, wherein the number of repetitions of the repeating step decreases when the estimated distance increases, i.e., the shorter the estimated distance is the more repetitions are performed.

2. The method according to claim 1, wherein the number of repetitions is in a range of 2 to 10000 repetitions, preferably between 10 to 1000 repetitions.

3. The method according to claim 1, wherein the step of calculating the distance between the first node and the second node comprises:

determining an overall time between the first time stamp and the second time stamp, subtracting accumulated internal delays in each of the first node and the second node from the overall time to obtain a total travelling time, and dividing the total travelling time with two times the number of repetitions to obtain an average time for the data packet to travel from the first node to the second node.

4. A first node for determining a distance between the first node and a second node, wherein the first node comprises a processing unit, a radio transceiver, an antenna, a battery, and a memory, the memory comprising instructions which when executed by the processing unit causes the first node to:

time stamp a data packet to be transmitted from the first node to the second node with a first time stamp, transmit the data packet to the second node, receive the transmitted data packet back from the second node, estimate the distance between the first node and the second node based on a round trip time between the first node and the second node for the data packet, determine a number of repetitions for a repeat step based on the estimated distance, repeat the transmit and the receive steps according to the determined number of repetitions, time stamp a last received data packet from the second node with a second time stamp, and calculate the distance between the first node and the second node based on the first time stamp and the second time stamp, the number of repetitions of the repeating step, and internal delays in the first node and the second node, wherein the first node is further caused to decrease the number of repetitions of the repeating step when the estimated distance increases, i.e., the shorter the estimated distance is the more repetitions are performed.

5. The first node according to claim 4, which is further caused to repeat the repeating step up to 10000 repetitions, preferably between 10 to 1000 repetitions.

6. The first node according to claim 4, which is further caused to:

determine an overall time between the first time stamp and the second time stamp, subtract accumulated internal delays in each of the first node and the second node from the overall time to obtain a total travelling time, and divide the total travelling time with two times the number of repetitions to obtain an average time for the data packet to travel from the first node to the second node, in order to calculate the distance between the first node and the second node.

7. The first node according to claim 4, wherein the processing unit further comprises a system clock for generating a time base, said system clock being unsynchronized with a system clock in a processing unit of the second node.

8. A computer program comprising computer program code, the computer program code being adapted, if executed by the processing unit of the first node, to implement the method according to claim 1.

9. A non-transitory computer readable storage medium storing the computer program according to claim 8.

* * * * *